United States Patent [19]

Kuhl

[11] Patent Number: 4,698,867
[45] Date of Patent: Oct. 13, 1987

[54] EGG WASHING MEANS USING STAGGERED SIZED FLAT BRUSHES

[76] Inventor: Henry Y. Kuhl, Kuhl Rd., P.O. Box 26, Flemington, N.J. 08822

[21] Appl. No.: 887,487

[22] Filed: Jul. 21, 1986

[51] Int. Cl.[4] .............................................. A01K 43/00
[52] U.S. Cl. ...................................... 15/3.13; 15/3.16
[58] Field of Search ....................... 15/3.1, 3.13–3.18; 134/6; 51/59 R

[56] References Cited

U.S. PATENT DOCUMENTS

| | | |
|---|---|---|
| 1,074,940 | 10/1913 | Freer . |
| 1,113,190 | 10/1914 | Brandt . |
| 1,205,117 | 11/1916 | Stamm . |
| 1,423,059 | 7/1922 | Williamson . |
| 1,542,347 | 6/1925 | McCullough . |
| 1,723,441 | 8/1929 | Richards . |
| 1,777,039 | 9/1930 | Hatch . |
| 1,780,924 | 11/1930 | Ingraham . |
| 1,955,749 | 4/1934 | Jones . |
| 1,964,275 | 6/1934 | Secondo . |
| 2,035,587 | 3/1936 | Brandenburg . |
| 2,179,474 | 11/1939 | Stebler . |
| 2,183,033 | 12/1939 | Segrin . |
| 2,199,831 | 5/1940 | Cunning . |
| 2,301,931 | 11/1942 | Davis . |
| 2,371,867 | 3/1945 | Bayles . |
| 2,412,565 | 12/1946 | Davis . |
| 2,442,475 | 6/1948 | Swanson . |
| 2,538,331 | 1/1951 | Ruzsicska . |
| 2,587,730 | 3/1952 | Hutchinson et al. . |
| 2,588,787 | 3/1952 | Wright . |
| 2,632,901 | 3/1953 | Markusen et al. . |
| 2,640,209 | 6/1953 | Johnson . |
| 2,673,361 | 3/1954 | McCutchan . |
| 2,979,746 | 4/1961 | Willsey . |
| 3,049,135 | 8/1962 | Kuhl et al. . |
| 3,099,848 | 8/1963 | Mountz . |
| 3,203,435 | 8/1965 | Kurtz . |
| 3,252,607 | 5/1966 | Rose et al. . |
| 3,349,419 | 10/1967 | Kuhl et al. . |
| 3,360,817 | 1/1968 | Halverson . |
| 3,392,414 | 7/1968 | Cathcart . |
| 3,909,290 | 9/1975 | Peppler et al. . |
| 4,276,977 | 7/1981 | van Kattenbroek . |
| 4,353,455 | 10/1982 | Mumma et al. . |
| 4,358,341 | 11/1982 | Berquist . |
| 4,499,623 | 2/1985 | Kuhl . |

FOREIGN PATENT DOCUMENTS

| | | |
|---|---|---|
| 758340 | 10/1932 | France . |
| 552170 | 12/1956 | Italy . |
| 164729 | 9/1970 | Netherlands . |
| 258761 | 4/1970 | U.S.S.R. . |

*Primary Examiner*—Edward L. Roberts
*Attorney, Agent, or Firm*—Sperry, Zoda & Kane

[57] ABSTRACT

An egg washing station is disclosed adapted to receive variously sized eggs for cleaning of the external surface thereof wherein the eggs are carried upon roller conveying means in longitudinally extending rows. A plurality of brushing means are included of alternating vertical heights in order to provide full and complete cleaning of various sized eggs when carried upon a horizontally extending conveyor. The brushes are mounted with respect to a brush frame such as to be movable longitudinally with respect to the direction of movement of the eggs carried upon the conveyor therebelow. A solution supply conduit extends across the station and dispenses cleaning solution through spray nozzles downwardly upon the brushes and eggs carried therebelow.

20 Claims, 2 Drawing Figures

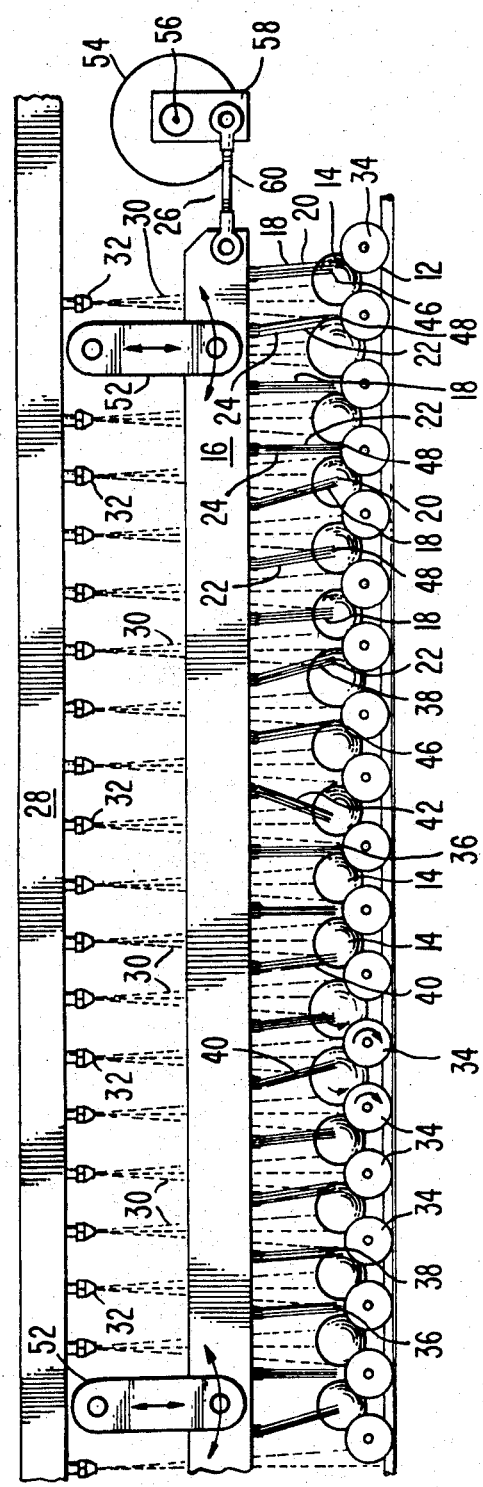

EGG WASHING MEANS USING STAGGERED SIZED FLAT BRUSHES

BACKGROUND OF THE INVENTION

1. Field Of The Invention

The present invention provides a means for cleaning of eggs particularly usable with respect to a "nest run" of eggs in which there has been no sorting of the eggs as to size. Eggs emanating from a hen house can vary greatly in size and as such the present invention provides a novel dual brush configuration to assure efficient cleaning of the exterior of large eggs as well as small eggs utilizing a single apparatus. This apparatus also provides this efficient cleaning without the normal problems of egg loss normally associated with systems which are usable for washing both very small and very large eggs.

2. Description Of The Prior Art

Many prior art devices are utilized for cleaning of eggs. However none uses the novel combination of brushes as shown in the present invention. Most conventional systems utilize flat brushes extending laterally across rows of longitudinally extending horizontally oriented eggs for achieving washing and cleaning thereof. Also prior art systems utilize dispensing means positioned above eggs and brushes to facilitate the application of cleaning solution to the brushes and the eggs positioned therebelow. None of these prior art devices specifically deals with the solving of the problem of great variations in egg sizes which is overcome by the configuration of the present invention.

SUMMARY OF THE INVENTION

The present invention provides an egg washing means utilizing staggered sized flat brushes which includes a main frame with a roller conveying means mounted longitudinally movable with respect thereto. The roller conveyor is adapted to carry the plurality of randomly sized eggs oriented in longitudinally extending rows therealong. A brush frame is movably secured with respect to the main frame and is positioned immediately above the roller conveying means. This brush frame is longitudinally movable with respect to the roller conveyor.

A first brush member is mounted within the brush frame and extends downwardly therefrom to a position immediately above the roller conveying means to contact eggs being carried thereon for cleaning. The first brush member comprises a plurality of first flat brush members which are spatially disposed with respect to one another and extend laterally across the roller conveyor.

A second brush member is also included mounted within the brush frame and extending downwardly therefrom to a position immediately above the roller conveyor. This second brush member preferably includes a plurality of second flat brush members spatially disposed with respect to one another and extending laterally across the conveyor. The second flat brush members are each positioned adjacent to one of said first brush members and extend downwardly further than the adjacent or any of the first brush members to be closer to the roller conveyor located therebelow to facilitate cleaning of smaller eggs. Normally the preferred vertical height of the first brush means will be 2½" and the preferred vertical height of the second flat brush members will be 2¾" but these sizes are not limiting but only displays the relative sizing desired by the configuration of the present invention.

A brush frame movement means is operably secured with respect to the brush frame means to cause reciprocating longitudinal movement of the brush frame with respect to the roller conveying means located therebelow. A solution supply conduit is positioned above the brush frame for providing cleaning solution to facilitate cleaning of the eggs traveling upon the roller conveying means therebelow. A spray nozzle means is positioned in the solution supply conduit and in fluid flow communication with respect to the cleaning solution for dispensing same from the solution supply conduit downwardly onto the first brush means and the second brush means and directly onto eggs traveling upon the roller conveying means therebelow. In this manner cleaning is greatly facilitated.

Preferably the roller conveyor includes individual rubber rollers to define egg receiving recesses oriented in longitudinally extending rows. These egg receiving recesses are preferably adapted to be able to receive eggs of a great variety of different sizes. Normally the first flat brush members and the second flat brush members will extend approximately vertically downward at an angle of approximately 90° with respect to the roller conveying means. It is also possible that either the first flat brush members or the second flat brush members will extend obliquely forwardly or rearwardly with respect to the conveying surface to facilitate cleaning.

The spray nozzle means will preferably be configured to dispense cleaning solution in a downwardly extending spray pattern of approximately sixty-five degrees in lateral width to facilitate wetting of the first brush means, the second brush means and the eggs traveling upon the roller conveyor.

The lower edges of the first flat brush members and the second flat brush members may be horizontally straight across but also may include scalloped or arcuate sections immediately above each longitudinally extending row to provide a more equalized amount of brush pressure upon the external surface of the egg to facilitate cleaning thereof while minimizing breakage. Preferably there will be six longitudinally extending rows of egg receiving recesses positioned below the arcuate scalloped sections.

A brush frame suspension means may be pivotally secured at one end to the main frame and pivotally secured at the other end to the brush frame. This brush frame movement means may include a drive means having a rotational output shaft therein. A crank arm may be fixedly secured at one end to the rotational output shaft and at the other end to a connecting rod which is pivotally secured with respect to the crank arm and pivotally secured at the opposite end with respect to the brush frame to facilitate longitudinal reciprocating movement of the brush frame and brushes associated therewith.

To facilitate cleaning, the brushes themselves may be of nylon material or may be of a silicon carbide material for additional friction.

It is an object of the present invention to provide an egg washing means with staggered sized flat brushes which provides more effective cleaning without egg loss of differently sized eggs.

It is an object of the present invention to provide an egg washing means with staggered sized flat brushes wherein differently sized vertically extending brushes are utilized.

It is an object of the present invention to provide an egg washing means with staggered sized flat brushes which is particularly usable for "nest runs" of eggs which are all different sizes as they come from poultry houses.

It is an object of the present invention to provide an egg washing means with staggered sized flat brushes wherein vertically extending brushing means vary between 2½" to 2¾" in height.

It is an object of the present invention to provide an egg washing means with staggered sized flat brushes wherein the brushing means is capable of moving back and forth longitudinally along the upper surface of longitudinally extending rows of eggs being carried upon conveying means.

It is an object of the present invention to provide an egg washing means with staggered sized flat brushes wherein strip brushes are utilized of two vertically extending dimensions alternating between longer brushes and shorter brushes.

It is an object of the present invention to provide an egg washing means with staggered sized flat brushes wherein flat brushes are utilized including horizontally extending straight lower edges thereof.

It is an object of the present invention to provide an egg washing means with staggered sized flat brushes wherein scalloped or arcuate lower edges are utilized.

It is an object of the present invention to provide an egg washing means with staggered sized flat brushes wherein a horizontal conveying means utilize rotating rubber rollers.

It is an object of the present invention to provide an egg washing means with staggered sized flat brushes wherein a spray is introduced from above the brushing means downwardly onto the brushes and eggs being carried in longitudinally extending rows therebelow.

It is an object of the present invention to provide an egg washing means with staggered sized flat brushes wherein the staggered brushes move longitudinally with respect to the directional movement of the eggs and slightly vertically toward and away from the eggs during the longitudinal strokes.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a side plan view of an embodiment of the egg washing means of the present invention; and FIG. 2 is a front plan view of another embodiment of an egg washing means of the present invention.

DETAILED DESCRIPTION OF THE PREFERRED EMBODIMENT

The present invention provides a main frame means 10 as well as a roller conveying means 12 movably mounted longitudinally with respect thereto. The main frame means 10 provides an environmental structure and the roller conveying means 12 defines longitudinally extending rows of eggs 14.

A brush frame means 16 is movably mounted with respect to main frame means 10 and is positioned immediately above the roller conveying means 12. A first brush means 18 and a second brush means 22 are mountable within the brush frame means 16 in such a manner that the bristles thereof are capable of contacting the outer surfaces of eggs 14 as they are carried upon roller conveying means 12 therebelow.

First brush means 18 preferably includes a plurality of first flat brush members 20 extending downwardly therefrom. In a similar manner second brush means 22 preferably includes a plurality of second flat brush members 24 extending downwardly therefrom. Preferably the first flat brush members 20 and the second flat brush members 24 will be alternatingly positioned lontitudinally along the brush frame 16. Also preferably the first flat brush members 20 will be of a shorter vertical dimension than the second flat brush members 24. In a preferred embodiment first flat brush member 20 will be approximately 2½" in vertical dimension where second flat brush members 24 will be 2¾" in vertical dimension. This slight variation in vertical distance allows for cleaning of both large and small eggs as they are carried upon the roller conveying means 12.

To facilitate the cleaning action achieved by first brush means 18 and second brush means 22, a brush frame movement means 26 may be included in the present invention to move brush frame 16 longitudinally and perhaps also slightly vertically with respect to the roller conveying means 12 and the eggs being carried thereon.

A brush frame suspension means 52 may pivotally secure the brush frame 16 with respect to the main frame 20 to allow brush frame movement means 26 to move the first brush means 18 and the second brush means 22 with respect to the eggs 14. Brush frame suspension means 52 may include a drive means 54 with a rotational output shaft 56 extending therefrom. A crank arm 58 may be fixedly secured with respect to the rotational output shaft and may be pivotally secured with respect to one end of a connecting rod 60. Connecting rod 60 may be pivotally secured at the opposite end from the crank arm 58 with respect to the brush frame means 16 for controlling movement thereof. With this configuration actuation of the drive means 54 will cause rotation of output shaft 56 and result in movement of crank arm 58 and connecting rod 60 to cause brush frame means 16 to move longitudinally and perhaps also somewhat vertically with respect to the eggs traveling upon the conveying means 12.

To facilitate cleaning, a solution supply conduit 28 may extend across the roller conveying means 12 at a position above the brush frame means 16. In this manner cleaning solution 30 will be supplied downwardly through spray nozzle means 32 to wet the first brush means 18, the second brush means 22 and the eggs 14 with cleaning solution to facilitate efficient cleaning thereof. Preferably the spray nozzle means 32 will be configured to define an approximately sixty-five degree spray pattern 44 as shown best in FIG. 2.

Roller conveying means 12 will define a plurality of longitudinally extending egg receiving recesses and will preferably be configured as rubber rollers 34 which may rotate to facilitate holding of eggs thereon.

The first flat brush members 20 and the second flat brush members 24 will extend downwardly approximately at an angle of ninety degrees as shown on members 36. Alternatively it is possible that the brush members will extend downwardly obliquely such as shown by brush members 38 or forwardly as shown by brush members 40. Similarly the brush members may extend obliquely rearwardly as shown by brush members 42. In this manner with the brushes capable of being oriented in a forwardly, downwardly or rearwardly orientation, it is possible to achieve overall cleaning of the eggs and all of the external surface thereof.

To make more uniform contact between the bristles of the brushes and the exterior surface of eggs 14, the lower edges of the first flat brush members and the lower edges of the second flat brush members may include scallops 50 thereon. This allows for more equal pressure upon the external surface of the eggs by the bristles of the brush as the arcuate surface of the egg passes immediately below and in abutment with respect to the brushes.

It is also possible that this lower edge will be flat as shown in the three longitudinally extending rows on the right portion of FIG. 2.

It is also possible that the brush frame suspension means 52 may be pivotally secured with respect to the main frame means 10 at various locations shown by the different center line 62 in FIG. 2 and in this manner provide a vertical adjustment means for controlling or varying the distance between the upper surface of the roller conveying means 12 and the lower edges 46 and 48 of the first and second flat brush members.

It should be appreciated that the present invention is particularly usable for six longitudinally extending rows but can be used with any specific number of such rows. Also the present invention is particularly usable for nylon brushes but if additional friction is required, the brushes may be configured of a silicon carbide. Also the present invention is usable with scalloped or non-scalloped lower edges of the flat brushes.

It should be appreciated that the alternating vertical distances for the flat brushes of the present invention allow for the cleaning of both small and large eggs. Also for intermediate sized eggs the shorter brushes will provide a more gentle brushing action where the longer brushes will present a more vigorous brushing action to the external surfaces thereof to further enhance the cleaning of even the medium sized eggs. Also since the downwardly extending spray of cleaning solution contacts the brushes and the eggs there will be a significant cleaning of the brushes in those configurations where the brushes are not perfectly downwardly vertically extending. Also since there is preferably a sixty-five degree lateral spray pattern, even the vertically extending brushes will be contacted by a downwardly moving cleaning solution.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An egg washing means using staggered sized flat brushes comprising:
   (a) a main frame means;
   (b) a roller conveying means mounted longitudinally movable with respect to said main frame means and being adapted to carry a plurality of variously sized eggs oriented in longitudinally extending rows thereon;
   (c) a brush frame means movably secured with respect to said main frame means and positioned immediately above said roller conveying means, said brush frame means being longitudinally movable with respect to said roller conveying means;
   (d) a first brush means mounted within said brush frame means and extending downwardly therefrom to a position immediately above said roller conveying means to contact eggs being carried thereon for cleaning thereof, said first brush means comprising a plurality of first flat brush members spatially disposed with respect to one another and extending laterally across said roller conveying means;
   (e) a second brush means mounted within said brush frame means and extending downwardly therefrom to a position immediately above said roller conveying means, said second brush means comprising a plurality of second flat brush members spatially disposed with respect to one another and extending laterally across said roller conveying means, said second flat brush members each being adjacent to one of said first brush members, each of said second brush members extending downwardly further than said adjacent first brush member to be closer to said roller conveying means located therebelow and to the eggs being carried thereon than said first flat brush members to facilitate cleaning thereof;
   (f) a brush frame movement means operably secured with respect to said brush frame means to cause reciprocating logitudinal movement of said brush frame means with respect to said roller conveying means located therebelow;
   (g) a solution supply conduit positioned above said brush frame means for providing cleaning solution to facilitate cleaning of the eggs traveling upon said roller conveying means therebelow; and
   (h) a spray nozzle means positioned in said solution supply conduit and in fluid flow communication with respect to the cleaning solution therein for dispensing same from said solution supply conduit downwardly onto said first brush means and said second brush means and directly onto eggs traveling upon said roller conveying means therebelow to facilitate cleaning thereof.

2. The egg washing means as defined in claim 1 wherein said roller conveying means include rubber rollers.

3. The egg washing means as defined in claim 1 wherein said first flat brush members and said second flat brush members extend approximately ninety degrees vertically downwardly with respect to said roller conveying means.

4. The egg washing means as defined in claim 1 wherein said first flat brush members and said second flat brush members extend between forty-five and ninety degrees obliquely longitudinally downwardly with respect to said roller conveying means to facilitate cleaning of eggs being carried thereon and to facilitate application of cleaning solution onto said first flat brush members and said second flat brush members.

5. The egg washing means as defined in claim 4 wherein said first flat brush members and said second flat brush members extend obliquely longitudinally forwardly with respect to the direction of longitudinal movement of said roller conveying means.

6. The egg washing means as defined in claim 4 wherein said first flat brush members and said second flat brush members extend obliquely longitudinally rearwardly with respect to the direction of longitudinal movement of said roller conveying means.

7. The egg washing means as defined in claim 1 wherein said spray nozzle means dispenses cleaning solution in a downwardly extending spray pattern of approximately sixty-five degrees in width to facilitate wetting of said first brush means, said second brush means and the egg traveling upon said roller conveying means.

8. The egg washing means as defined in claim 1 wherein the lower edges of said first flat brush members and the lower edges of said second flat brush members are horizontally straight.

9. The egg washing means as defined in claim 1 wherein the lower edges of said first flat brush members and the lower edges of said second flat brush members are horizontally scalloped immediately above each longitudinally extending row of eggs.

10. The egg washing means as defined in claim 1 wherein said roller conveying means defines six longitudinally extending rows of egg receiving recesses.

11. The egg washing means as defined in claim 1 wherein said brush frame movement means includes a brush frame suspension means being pivotally secured at one end to said main frame means and being pivotally secured at the other end to said brush frame means.

12. The egg washing means as defined in claim 1 wherein said brush frame movement means includes:
  (a) drive means including a rotational output shaft;
  (b) a crank arm fixedly secured at one end to said rotational output shaft; and
  (c) a connecting rod pivotally secured at one end to said brush frame means and pivotally secured at the other end to said crank arm at the opposite end thereof from said rotational output shaft.

13. The egg washing means as defined in claim 1 wherein said brush frame means is adjustably positionable vertically with respect to said roller conveying means.

14. The egg washing means as defined in claim 1 wherein one of said first flat brush members is located in the upstreammost position within said brush frame means to contact an egg being carried upon said roller conveying means prior to the egg being contacted by one of said second flat brush members.

15. The egg washing means as defined in claim 1 wherein said first brush means and said second brush means include bristles of nylon.

16. The egg washing means as defined in claim 1 wherein said first brush means and said second brush means include bristles of silicon carbide.

17. The egg washing means as defined in claim 1 wherein said first flat brush members are $2\frac{1}{2}$ inches in vertical length.

18. The egg washing means as defined in claim 1 wherein said second flat brush members are $2\frac{3}{4}$ inches in vertical length.

19. The means as defined in claim 1 wherein said brush frame means is longitudinally movable approximately $1\frac{7}{8}$ inches with respect to said roller conveying means.

20. An egg washing means using staggered sized flat brushes comprising:
  (a) a main frame means;
  (b) a roller conveying means including a plurality of rubber rollers mounted longitudinally movable with respect to said main frame means and positioned to define six longitudinally extending rows of egg receiving recesses which are adapted to carry a plurality of variously sized eggs oriented in six longitudinally extending rows thereon.
  (c) a brush frame means movably secured with respect to said main frame means and positioned immediately above said roller conveying means, said brush frame means being longitudinally movable with respect to said roller conveying means, said brush frame means being vertically adjustable with respect to said roller conveying means;
  (d) a first brush means mounted within said brush frame means and extending downwardly therefrom to a position immediately above said roller conveying means to contact eggs being carried thereon for cleaning thereof, said first brush means comprising a plurality of first flat brush members being approximately $2\frac{1}{2}$ inches in vertical dimension and being spatially disposed with respect to one another and extending laterally across said roller conveying means, said first flat brush members extending between forty-five and ninety degrees obliquely longitudinally downwardly with respect to said roller conveying means to facilitate application of cleaning solution onto said first flat brush members;
  (e) a second brush means mounted within said brush frame means and extending downwardly therefrom to a position immediately above said roller conveying means, said second brush means comprising a plurality of second flat brush members being approximately $2\frac{3}{4}$ inches in vertical dimension and being spatially disposed with respect to one another and extending laterally across said roller conveying means, said second flat brush members extending between forty-five and ninety degrees obliquely longitudinally downwardly with respect to said roller conveying means to facilitate application of cleaning solution onto said second flat brush members, said second flat brush members each being spatially disposed immediately downstream from one of said first brush members, each of said second brush members extending downwardly further than said adjacent first brush member to be closer to said roller conveying means located therebelow and to the eggs being carried thereon than said first flat brush members to facilitate cleaning thereof;
  (f) a brush frame movement means operably secured with respect to said brush frame means to cause reciprocating longitudinal movement of said brush frame means of approximately $1\frac{7}{8}$ inches with respect to said roller conveying means located therebelow, said brush frame movement means further comprising;
    (1) brush frame suspension means pivotally secured at one end to said main frame means and being pivotally secured at the other end to said brush frame means;
    (2) a drive means including a rotational output shaft;
    (3) a crank arm fixedly secured at one end to said rotational output shaft;
    (4) a connecting rod pivotally secured at one end to said brush frame means and pivotally secured at the other end to said crank arm at the opposite end thereof from said rotational output shaft;
  (g) a solution supply conduit positioned above said brush frame means for providing cleaning solution to facilitate cleaning of the eggs traveling upon said roller conveying means therebelow; and (h) a spray nozzle means positioned in said solution supply conduit and in fluid flow communication with respect to the cleaning solution therein for dispensing same from said solution supply conduit downwardly in a spray pattern of approximately sixty-five degrees in width to facilitate application of cleaning solution onto said first brush means and said second brush means and directly onto eggs traveling upon said roller conveying means therebelow to aid in cleaning thereof.

* * * * *